(12) United States Patent
Uhm et al.

(10) Patent No.: US 6,257,023 B1
(45) Date of Patent: *Jul. 10, 2001

(54) FIBER OPTIC DRAW FURNACE HAVING A HEATING ELEMENT AND A FURNACE SHELL, FEATURING RIGIDIFIED HIGH PURITY GRAPHITE FELT INSULATION THEREBETWEEN

(75) Inventors: Daniel D. Uhm, Vinton; Robert A. Spencer, Roanoke, both of VA (US)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,864

(22) Filed: Mar. 25, 1998

Related U.S. Application Data

(60) Provisional application No. 60/041,728, filed on Mar. 27, 1997.

(51) Int. Cl.$^7$ .................................................. C03B 37/029
(52) U.S. Cl. ........................ 65/537; 65/374.15; 65/374.12
(58) Field of Search ................................ 65/374.15, 427, 65/537, 374.12

(56) References Cited

U.S. PATENT DOCUMENTS

| | | |
|---|---|---|
| 2,837,412 | 6/1958 | Bennett . |
| 3,350,182 | 10/1967 | Hunter et al. . |
| 3,582,305 | 6/1971 | Dunlap et al. . |
| 3,634,116 | 1/1972 | Woerner et al. . |
| 3,664,859 | 5/1972 | Beatty et al. . |
| 3,969,124 | 7/1976 | Stewart . |
| 4,126,436 | 11/1978 | Bailey . |
| 4,157,906 | 6/1979 | Bailey . |
| 4,174,842 | 11/1979 | Partus . |
| 4,277,270 | 7/1981 | Krohn . |
| 4,277,271 | 7/1981 | Krohn . |
| 4,279,952 | 7/1981 | Kodama et al. . |
| 4,309,201 | 1/1982 | Klop et al. . |
| 4,373,943 | 2/1983 | Gouronnec et al. . |
| 4,400,190 | 8/1983 | Briere . |
| 4,407,666 | 10/1983 | Briere . |
| 4,490,828 | * 12/1984 | Fukuham . |

(List continued on next page.)

FOREIGN PATENT DOCUMENTS

| | | |
|---|---|---|
| 2818550 | 3/1979 | (DE) . |
| 1523595 | 9/1978 | (GB) . |
| 2192698 | 1/1988 | (GB) . |
| 53-135648 | 11/1978 | (JP) . |
| 58-161939 | 9/1983 | (JP) . |
| 2242579 | 9/1990 | (JP) . |

OTHER PUBLICATIONS

"Drawing Techniques for Optical Fibers," by Motohiro Nakahara et al., Review of the Electrical Communication Laboratories, vol. 26, Nos. 3–4, Mar.–Apr. 1978.

(List continued on next page.)

Primary Examiner—John Hoffmann
(74) Attorney, Agent, or Firm—Ware, Fressola, Van Der Sluys & Adolphson LLP

(57) ABSTRACT

The present invention provides an improvement to a fiber optic draw furnace having a heating element (22) arranged inside a furnace shell (20) for drawing an optical fiber (F) from a preform (P). The fiber optic draw furnace (10) has one or more pieces of fiber draw furnace insulation (14, 16, 18) to separate the heating element (22) from the furnace shell (20) for reducing the thermal transfer therebetween. At least one of the pieces of fiber draw furnace insulation (14, 16, 18) is made from rigidified high purity graphite felt that provides highly efficient thermal insulation between the heating element (22) and the outer furnace shell (20). The rigidified high purity graphite felt insulation (14), (16, 18) includes either a bottom insulation ring (14), a cylindrical insulation insert (16) or a cylindrical insulation canister (18).

15 Claims, 4 Drawing Sheets

U.S. PATENT DOCUMENTS

| | | |
|---|---|---|
| 4,550,015 | 10/1985 | Korb et al. . |
| 4,582,632 | 4/1986 | Rokuju et al. . |
| 4,608,473 | 8/1986 | Paek et al. . |
| 4,668,496 | 5/1987 | Korb et al. . |
| 4,673,427 | 6/1987 | Van Der Giessen et al. . |
| 4,842,628 * | 6/1989 | Kreutzer ................................ 65/427 |
| 4,911,742 | 3/1990 | Newbould et al. . |
| 4,950,319 | 8/1990 | Lane et al. . |
| 4,988,374 | 1/1991 | Harding et al. . |
| 5,017,209 * | 5/1991 | Yoshimura ........................ 65/374.15 |
| 5,076,824 | 12/1991 | Miller . |
| 5,120,341 | 6/1992 | Nozawa et al. . |
| 5,133,796 * | 7/1992 | Tsuchiya ............................ 65/374.15 |
| 5,145,732 * | 9/1992 | Kyutoku . |
| 5,173,332 * | 12/1992 | Pastureau . |
| 5,225,379 | 7/1993 | Howard . |
| 5,259,856 | 11/1993 | Ohga et al. . |
| 5,284,499 | 2/1994 | Harvey et al. . |
| 5,292,460 | 3/1994 | Kyutoku et al. . |
| 5,306,322 * | 4/1994 | Ishikawa ........................... 65/374.15 |
| 5,308,947 | 5/1994 | Fleming, Jr. . |
| 5,320,658 | 6/1994 | Ohga et al. . |
| 5,350,433 | 9/1994 | Baniel . |
| 5,476,685 * | 12/1995 | Rocher . |
| 5,545,246 | 8/1996 | Lysson et al. . |
| 5,587,203 * | 12/1996 | Soda . |
| 5,637,130 | 6/1997 | Nagayama et al. . |
| 5,713,979 * | 2/1998 | Nicholson ........................ 65/374.15 |

OTHER PUBLICATIONS

"Drawing Lightguide Fiber," by David H. Smithgall et al., Western Electric Eng. (USA), vol. 24, No. 1, Winter 1980.

"Patent Abstract of Great Britain," Application No. GB197809, Payne et al., "Electrical Resistance Furnaces," Oct. 31, 1974.

"Patent Abstract of Japan," Application No. 58–161939, Nippon Teleg & Teleph., "Optical fibre spinning furnace–having metal carbide . . . " Sep. 26, 1983.

"Patent Abstract for German Patent," Application No. 2818550, K. Yoshimura et al., "Drawing optical fibre from prefabricated blank . . . " Mar. 15, 1979.

"Patent Abstract of Japan," Application No. 0242579, Tokai Carbon KK, "Graphite heating element mfr.–by interposition polymide adhesive . . . " Sep. 1990.

"Patent Abstract of Japan," Application No. 52–50298, K. Yoshimura et al., "Production of Fibers Optical Communication," Nov. 27, 1978.

* cited by examiner

FIG. 2 (RIGID BOTTOM INSULATION RING)

FIG. 3 (CANISTER)

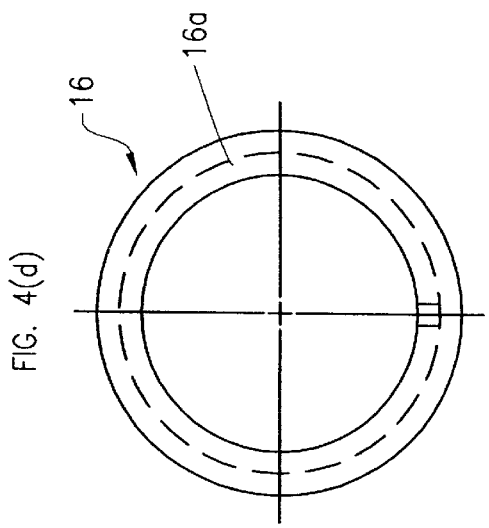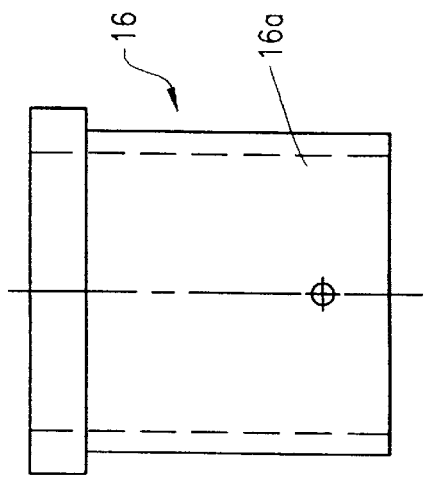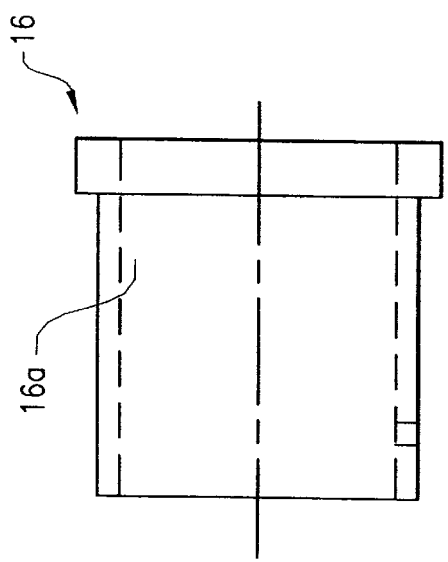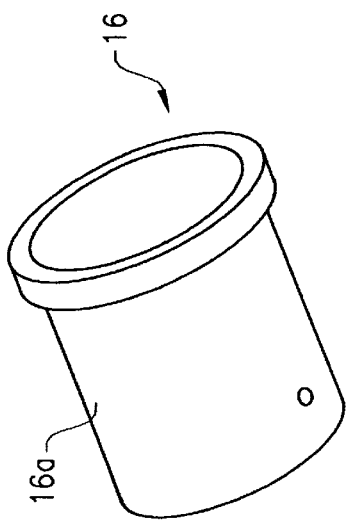
FIG. 4 (INSERT)

US 6,257,023 B1

FIBER OPTIC DRAW FURNACE HAVING A HEATING ELEMENT AND A FURNACE SHELL, FEATURING RIGIDIFIED HIGH PURITY GRAPHITE FELT INSULATION THEREBETWEEN

This application claims the benefit of U.S. Provisional Application(s) No(s).: 60/041,728 filed Mar. 27, 1997

BACKGROUND OF THE INVENTION

1. Field Of Invention

The present invention relates to a fiber optic draw furnace for making optical fiber; and more particularly to insulators for separating a heating element from an outer furnace shell in graphite resistance and inductance furnaces.

2. Discussion of Related Art

Known graphite resistance fiber optic draw furnaces typically have a standard graphite felt insulation insert that may be nonhomogeneous (density variation). The standard graphite felt insulation is very "dirty" (loose graphite particles and graphite fibers). The standard graphite felt is also very susceptible to moisture and oxygen absorption.

SUMMARY OF THE INVENTION

The present invention provides an improvement to a fiber optic draw furnace having a heating element arranged inside a furnace shell for drawing an optical fiber from a preform. The fiber optic draw furnace has one or more fiber draw furnace insulation to separate the heating element from the furnace shell for reducing the thermal transfer therebetween. At least one of the fiber draw furnace insulation means is made from rigidified high purity graphite felt that provides highly efficient thermal insulation between the heating element and the outer furnace shell. The rigidified high purity graphite felt insulation may include either a bottom insulation ring, a cylindrical insulation insert or a cylindrical insulation canister.

Some advantages of the rigidified high purity graphite felt insulation include the fact that it has less density variation than standard (i.e. non-rigidified) felt, and therefore, has superior temperature uniformity; does not generate loose graphite particles or graphite fiber; and are resistant to moisture and oxygen absorption.

BRIEF DESCRIPTION OF THE DRAWING

The invention, both as to its organization and manner of operation, may be further understood by reference to a drawing (not drawn to scale) which includes FIGS. 1–4, taken in conjunction with the following description.

FIG. 2, including

FIG. 3, including

FIG. 4, including FIGS. 4(a), 4(b), 4(c), is 4(d) are an illustration of an insulation insert shown of the fiber optic draw furnace shown in FIG. 1.

BEST MODE OF THE INVENTION

Fiber Optic Draw Furnace 10

Figure 1:
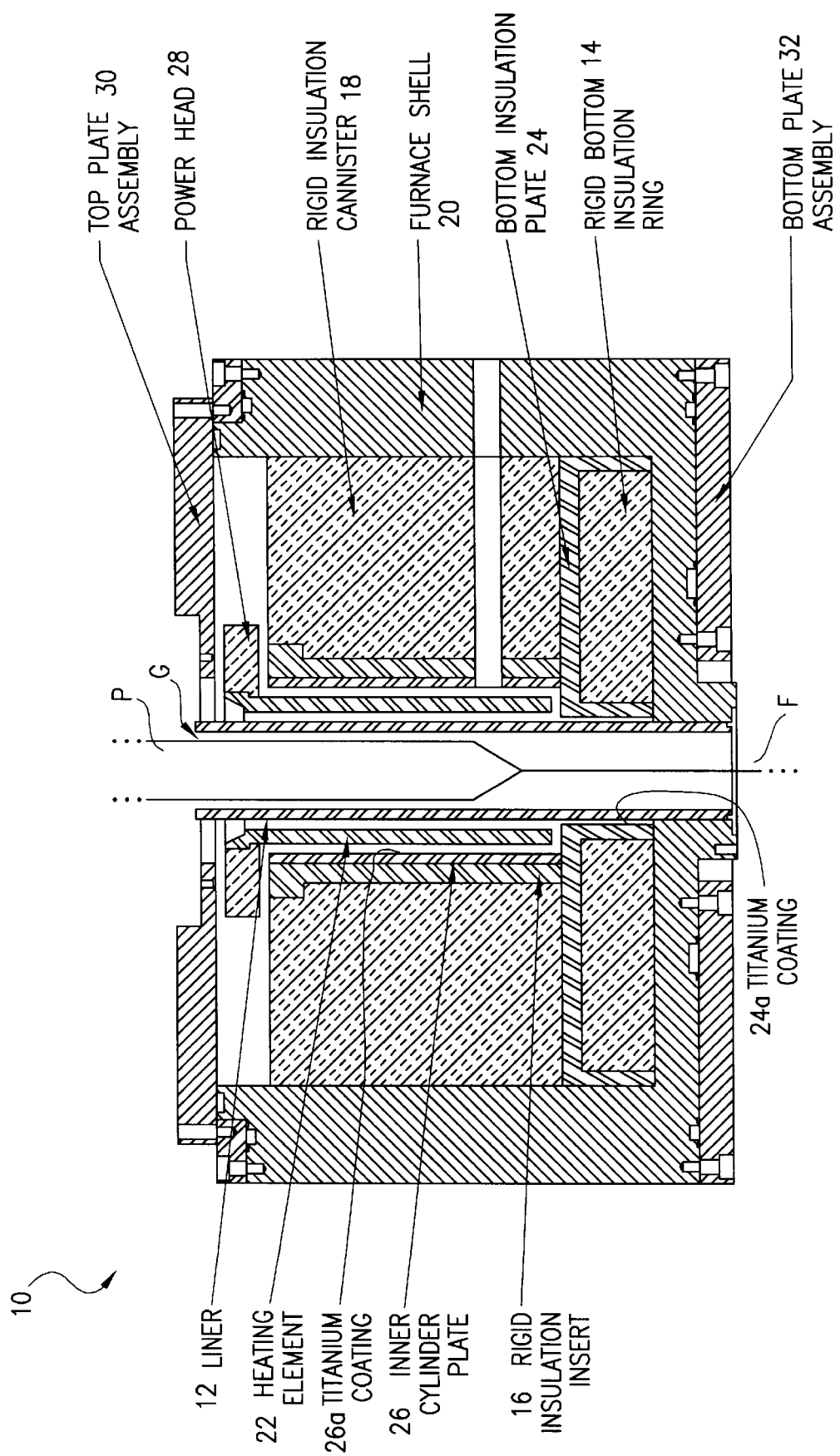
FIG. 1 is a schematic diagram of a fiber optic draw furnace, which is the subject matter of the present invention.

FIG. 1 shows part of a graphite resistance fiber draw furnace generally indicated as 10 for drawing an optical fiber (F) from a preform (P). The graphite resistance fiber draw furnace 10 includes a graphite liner 12, a bottom insulation ring 14, a cylindrical insulation insert 16, a cylindrical insulation canister 18, a furnace shell 20, a heating element 22, a bottom graphite insulation plate 24, an inner graphite cylinder 26, a power head 28, a top plate assembly 30 and a bottom plate assembly 32.

High Density Extruded Graphite Liner 12

In FIG. 1, the high density extruded graphite liner 12 has a cylindrical shape, and the heating element 22 is cylindrical and arranged around the high density extruded graphite liner 12. The graphite liner 12 is a high density extruded graphite liner that is impregnated with vitreous carbon completely through its entire graphite liner matrix. The high density extruded graphite liner 12 provides an improved barrier between the graphite heating element 22 and the fiber optic preform (P) that is comparable to an isomolded graphite liner but much more economical in cost.

High Density Extruded Graphite Heating Element 22

In FIG. 1, the heating element 22 is a high density extruded graphite heating element that is impregnated with vitreous carbon completely through its entire graphite heating element matrix, making the graphite furnace 10 effectively a high temperature thermal energy source. The impregnation of a lower grade graphite (low density extruded) with vitreous (glassy) carbon produces a heating element that is comparable in performance and benefits to expensive high density isomolded graphite heating elements with several additional benefits, as discussed above.

Rigidified High Purity Graphite Felt Insulation 14, 16, 18

In FIG. 1, the insulation 14, 16, 18 are made from rigidified high purity graphite felt that provides highly efficient thermal insulation between the graphite heating element 22 and the outer furnace shell 20. Rigidified high purity graphite felt is known in the art, and consists of a homogeneous mixture of graphite fibers and a graphite-based resin that is solidified. The insulation 14, 16, 18 is shown in greater detail in FIGS. 2–4, including the bottom insulation ring 14 in FIG. 2, the insulation canister 18 in FIG. 3 and the insulation insert 16 in FIG. 4, and discussed in greater detail below.

Figure 2A:
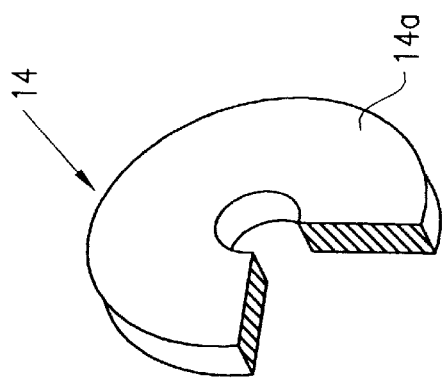
FIGS. 2(a), 2(b) and 2(c), is an illustration of a bottom insulation ring of the fiber optic draw furnace shown in FIG. 1.
Figure 2B:
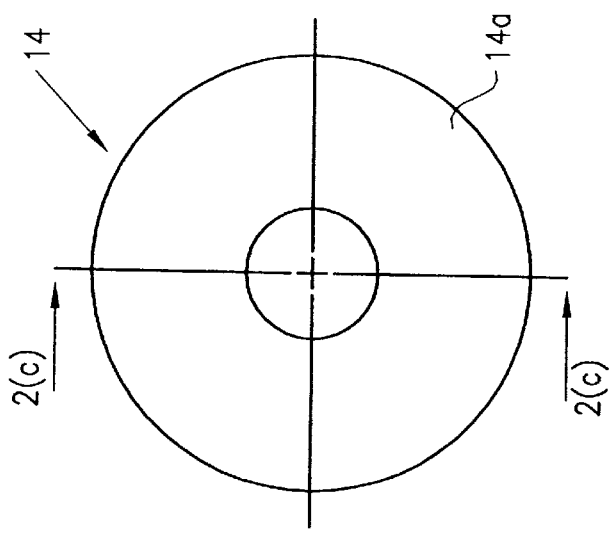
Figure 2C:
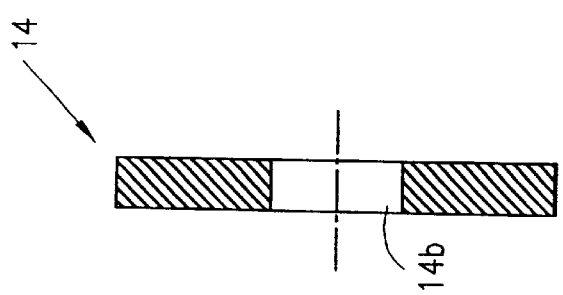

The bottom insulation ring 14 in FIG. 2 is shown in FIGS. 2(a), (b), (c) and has a top surface with a thin layer of reflective graphite resin generally indicated as 14a, a ring opening 14b for fitting around the graphite liner 12, and a bottom surface (not shown). The function of the bottom insulation ring 14 is to insulate thermally the bottom of the furnace shell 20 from the high temperature heating element 22. The bottom insulation ring 14 is manufactured by machining the rigidified high purity graphite felt into its final dimensions. The machined material may be then coated on all surfaces with a thin layer of reflective graphite resin generally indicated as 14a that provides enhanced thermal insulating properties, which results in improved efficiency and increased life of the graphite heating element 22. In addition, the coating 14a provides a clean surface free of graphite particles and graphite fibers which is essential for the manufacturing of high strength optical fiber. The coating 14a also adds mechanical strength.

Figure 3A:
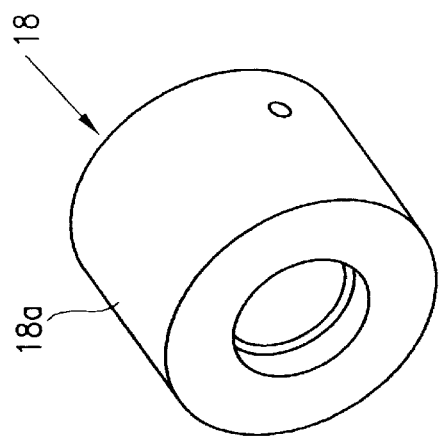
FIGS. 3(a), 3(b) and 3(c), is an illustration of a insulation canister of the fiber optic draw furnace shown in FIG. 1.
Figure 3B:
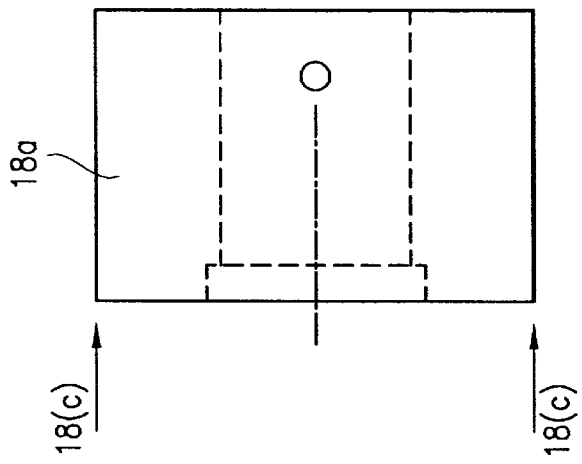
Figure 3C:
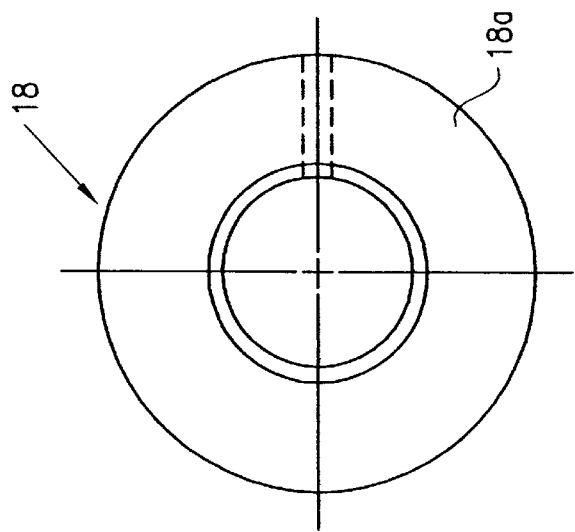

The insulation canister 18 and the insulation insert 16 are respectively shown in FIGS. 3–4. The function of the insulation insert 16 and the insulation canister 18 is to thermally insulate the side of the furnace shell from the heating element 22. The insulation insert 16 (FIG. 4) fits into the inner diameter of the insulation canister 18 (FIG. 3). All surfaces are coated with either a reflective graphite resin or a thin layer of reflective graphite foil laminated onto the surface of the rigid insulation material. The reflective graphite resin or the thin layer of reflective graphite foil are generally indicated as 16a, 18a. Similar to the bottom insulation ring 14, the insulation insert 16 and the insulation canister 18 are manufactured by machining the rigidified high purity graphite felt into its final dimensions. The graphite foil and/or reflective coating 16a, 18a on all of their respective surfaces results in improved thermal efficiency of the furnace and increased life of the heating element 22. In addition, the graphite foil and/or reflective coating 16a, 18a provides a clean surface free of graphite particles and graphite fibers which is essential for the manufacturing of high strength optical fiber. The graphite foil and/or reflective coating 16a, 18a also adds mechanical strength.

Other advantages of the insulation ring 14, the graphite felt insulation insert 16 and the insulation canister 18 are that they have less density variation than standard felt, and therefore, have superior temperature uniformity; do not generate loose graphite particles or graphite fibers; and are resistant to moisture and oxygen absorption.

The Two-Piece, TiC Coated, Barrier Plate 24, 26

In FIG. 1, the fiber optic draw furnace 10 has a new two-piece barrier including 24, 26 that consists of the bottom graphite insulation plate 24 and the inner graphite cylinder 26. The two-piece barrier 24, 26 is arranged between the heating element 22 and the 20 insulation pieces 14, 16, 18. The inner graphite cylinder 26 is coated on the inner diameter with titanium carbide (TiC) 26a. The bottom insulation plate 24 has a titanium coating 24a.

The TiC coated two-piece barrier 24, 26 may have other applications in glass drawing, and manufacturing processes or industries utilizing graphite resistance furnace technologies.

The graphite resistance fiber optic draw furnace known in the prior art typically has a heating element, furnace insulation and a graphite barrier between the heating element and the furnace insulation for protecting the furnace insulation. The prior art graphite barrier produces graphite particulate that degrades the optical fiber produced therein, has a short heating element life, reduces the life of the furnace insulation, and degrades overall furnace efficiency. In contrast, the new and improved two-piece barrier plate 24, 26 having a TiC coating results in a cleaner furnace environment, which is important for manufacturing high strength optical fiber, longer heating element life, longer life of the furnace insulation, and improved furnace efficiency.

Optimal Liner/Preform Gap Range of 3.5 to 7.5 Millimeters

In FIG. 1, the graphite resistance fiber optic draw furnace 10 has an air gap G in a range of 3.5 to 7.5 millimeters (spacing) between an outer surface of the preform (P) and the inside surface of the graphite liner 12 that is maintained to minimize graphite particulate contamination of the preform and fiber during the fiber optic drawing process. The same gap G is also important for minimizing the formation of SiC during the fiber optic drawing process.

In the prior art, the significance or importance of "gap" size (spacing) between the preform (P) and the graphic liner is not given much consideration. However, it has been found that the maintenance of the air gap G in a range of 3.5 to 7.5 millimeters between the preform (P) and graphite liner 12 minimizes graphite particulate contamination of the preform P and fiber F during the fiber optic drawing process, and also minimizes the formation of SiC during the fiber optic drawing process.

THE SCOPE OF THE INVENTION

It is also to be understood that the claims are intended to cover all of the generic and specific features of the invention herein described and all statements of the scope of the invention which, as a matter of language, might be said to fall therebetween. For example, the scope of the invention is intended to cover a fiber optic draw furnace having one or more of the aforementioned improvements.

What is claimed is:

1. A fiber optic draw furnace (10) having a heating element (22) arranged inside a furnace shell (20) for drawing an optical fiber (F) from a preform (P), and having one or more fiber draw furnace insulation means (14, 16, 18) to separate the heating element (22) from the furnace shell (20) for reducing the thermal transfer therebetween;

at least one of the fiber draw furnace insulation means (14, 16, 18) being made from rigidified high purity graphite felt consisting of a homogeneous mixture of graphite fibers and a graphite-based resin that is solidified for providing highly efficient thermal insulation between the heating element (22) and the outer furnace shell (20);

the one or more insulation means (14, 16, 18) including either a bottom insulation ring (14), a cylindrical insulation insert (16) or a cylindrical insulation canister (18);

the fiber optic draw furnace (10) including a bottom insulation plate (24) having a titanium coating; and the bottom insulation ring (14) being arranged between the bottom insulation plate (24) and the outer furnace shell (20).

2. A fiber optic draw furnace (10) according to claim 1, wherein the fiber optic draw furnace (10) is a graphite resistance furnace.

3. A fiber optic draw furnace (10) according to claim 1, wherein the fiber optic draw furnace (10) has a graphite liner (12) having a corresponding shape to the shape of the heating element (12) for providing a barrier between the heating element (12) and the preform (P), and wherein an air gap (G) between the outer surface of the preform (P) and the graphite liner (12) is in a range of 3.5 to 7.5 millimeters.

4. A fiber optic draw furnace (10) according to claim 3, wherein the air gap is substantially uniform between the graphite liner (12) and the outer surface of the preform (P) about the circumference of the preform (P).

5. A fiber optic draw furnace (10) having a heating element (22) arranged inside a furnace shell (20) for drawing an optical fiber (F) from a preform (P), and having one or more fiber draw furnace insulation means (14, 16, 18) to separate the heating element (22) from the furnace shell (20) for reducing the thermal transfer therebetween;

at least one of the fiber draw furnace insulation means (14, 16, 18) being made from rigidified high purity graphite felt consisting of a homogeneous mixture of graphite fibers and a graphite-based resin that is solidified for providing highly efficient thermal insulation between the heating element (22) and the outer furnace shell (20);

the one or more insulation means (14, 16, 18) including either a bottom insulation ring (14), a cylindrical insulation insert (16) or a cylindrical insulation canister (18);

the fiber optic draw furnace (10) including an inner cylinder plate (26) having a titanium coating that is arranged around the heating element (22); and the cylindrical insulation insert (16) being arranged around the inner cylinder (26).

6. A fiber optic draw furnace (10) according to claim 5, wherein the fiber optic draw furnace (10) has a graphite liner (12) having a corresponding shape to the shape of the heating element (12) for providing a barrier between the heating element (12) and the preform (P); and wherein an air gap (G) between the outer surface of the preform (P) and the graphite liner (12) is in a range of 3.5 to 7.5 millimeters.

7. A fiber optic draw furnace (10) according to claim 6, wherein the air gap is substantially uniform between the graphite liner (12) and the outer surface of the preform (P) about the circumference of the preform (P).

8. A fiber optic draw furnace (10) according to claim 5, wherein the fiber optic draw furnace (10) is a graphite resistance furnace.

9. A fiber optic draw furnace (10) according to claim 5 wherein the fiber optic draw furnace (10) is an inductance furnace.

10. A fiber optic draw furnace (10) having a heating element (22) arranged inside a furnace shell (20) for drawing an optical fiber (F) from a preform (P), and having one or more fiber draw furnace insulation means (14, 16, 18) to separate the heating element (22) from the furnace shell (20) for reducing the thermal transfer therebetween;

at least one of the fiber draw furnace insulation means (14, 16, 18) being made from rigidified high purity graphite felt consisting of a homogeneous mixture of graphite fibers and a graphite-based resin that is solidified for providing highly efficient thermal insulation between the heating element (22) and the outer furnace shell (20);

the one or more insulation means (14, 16, 18) including either a bottom insulation ring (14), a cylindrical insulation insert (16) or a cylindrical insulation canister (18);

the fiber optic draw furnace (10) including an inner cylinder plate (26) having a titanium coating that is arranged around the heating element (22); and the cylindrical insulation canister (18) being arranged between the cylindrical insulation insert (16) and the outer furnace shell (20).

11. A fiber optic draw furnace (10) according to claim 10, wherein the fiber optic draw furnace (10) has a graphite liner (12) having a corresponding shape to the shape of the heating element (12) for providing a barrier between the heating element (12) and the preform (P); and wherein an air gap (G) between the outer surface of the preform (P) and the graphite liner (12) is in a range of 3.5 to 7.5 millimeters.

12. A fiber optic draw furnace (10) according to claim 11, wherein the air gap is substantially uniform between the graphite liner (12) and the outer surface of the preform (P) about the circumference of the preform (P).

13. A fiber optic draw furnace (10) according to claim 10, wherein the fiber optic draw furnace (10) is a graphite resistance furnace.

14. A fiber optic draw furnace (10) according to claim 10, wherein the fiber optic draw furnace (10) is an inductance furnace.

15. A fiber optic draw furnace (10) having a heating element (22) arranged inside a furnace shell (20) for drawing an optical fiber (F) from a preform (P), and having one or more fiber draw furnace insulation means (14, 16, 18) to separate the heating element (22) from the furnace shell (20) for reducing the thermal transfer therebetween;

at least one of the fiber draw furnace insulation means (14, 16, 18) being made from rigidified high purity graphite felt consisting of a homogeneous mixture of graphite fibers and a graphite-based resin that is solidified for providing highly efficient thermal insulation between the heating element (22) and the outer furnace shell (20);

wherein the fiber optic draw furnace (10) further comprises:

an outer furnace shell (20);

a bottom insulation plate (24) having a titanium coating and being arranged in the outer furnace shell (20);

a bottom insulation ring (14) made of rigidified high purity graphite felt having a reflective coating and being arranged between the bottom insulation plate (24) and the outer furnace shell (20);

an inner cylinder plate (26) having a titanium coating and being arranged around the heating element (22) and resting on the bottom insulation plate (24);

a cylindrical insulation insert (16) made of rigidified high purity graphite felt having a reflective coating and being arranged around the an inner cylinder (26) and resting on the bottom insulation plate (24); and a cylindrical insulation canister (18) made of rigidified high purity graphite felt having a reflective coating and being arranged between the insulation insert (16) and the outer furnace shell (20).

* * * * *